(12) United States Patent
Archer et al.

(10) Patent No.: US 8,010,718 B2
(45) Date of Patent: Aug. 30, 2011

(54) DIRECT MEMORY ACCESS IN A HYBRID COMPUTING ENVIRONMENT

(75) Inventors: Charles J. Archer, Rochester, MN (US); James E. Carey, Rochester, MN (US); Jeffrey M. Ceason, Holmen, WI (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/364,590

(22) Filed: Feb. 3, 2009

(65) Prior Publication Data

US 2010/0198997 A1    Aug. 5, 2010

(51) Int. Cl.
*G06F 3/00* (2006.01)
*G06F 13/00* (2006.01)

(52) U.S. Cl. .............. 710/22; 710/8; 710/15; 710/33; 710/52

(58) Field of Classification Search ............ None
See application file for complete search history.

(56) References Cited

U.S. PATENT DOCUMENTS

| | | | |
|---|---|---|---|
| 4,989,131 A | 1/1991 | Stone | |
| 5,363,484 A | 11/1994 | Desnoyers et al. | |
| 5,467,459 A | 11/1995 | Alexander et al. | |
| 5,590,345 A | 12/1996 | Barker et al. | |
| 5,613,146 A | 3/1997 | Gove et al. | |
| 6,010,194 A | 5/2000 | Yu et al. | |
| 6,266,745 B1 | 7/2001 | De Backer et al. | |
| 6,377,979 B1 | 4/2002 | Yamashita et al. | |
| 6,473,849 B1 | 10/2002 | Keller et al. | |
| 6,598,130 B2 | 7/2003 | Harris et al. | |
| 7,383,330 B2 | 6/2008 | Moran et al. | |
| 7,418,574 B2 | 8/2008 | Mathur et al. | |
| 7,469,273 B2 | 12/2008 | Anderson et al. | |
| 7,631,023 B1 | 12/2009 | Kaiser et al. | |
| 7,668,924 B1 | 2/2010 | Young et al. | |
| 7,814,295 B2 | 10/2010 | Inglett et al. | |
| 2002/0056033 A1* | 5/2002 | Huppenthal | 712/15 |
| 2002/0108059 A1 | 8/2002 | Canion et al. | |
| 2003/0061432 A1* | 3/2003 | Huppenthal et al. | 710/305 |
| 2003/0226018 A1 | 12/2003 | Tardo et al. | |
| 2006/0018341 A1 | 1/2006 | Pettey et al. | |
| 2006/0168435 A1 | 7/2006 | Svensson et al. | |

(Continued)

OTHER PUBLICATIONS

Rabenseifner, Rolf, Some Aspects of Message-Passing on Future Hybrid Systems, www.springerlink.com [online], 2008 [accessed online on Nov. 12, 2010], URL: http://www.springerlink.com/content/m12170217065w185/.*

(Continued)

*Primary Examiner* — Tariq Hafiz
*Assistant Examiner* — Scott Sun
(74) *Attorney, Agent, or Firm* — Biggers & Ohanian, LLP

(57) ABSTRACT

Direct memory access ('DMA') in a hybrid computing environment that includes a host computer, an accelerator, the host computer and the accelerator adapted to one another for data communications by a system level message passing module, where DMA includes identifying, by the system level message passing module, a buffer of data to be transferred from the host computer to the accelerator according to a DMA protocol; segmenting, by the system level message passing module, the buffer of data into a predefined number of memory segments; pinning, by the system level message passing module, the memory segments against paging; and asynchronously with respect to pinning the memory segments, effecting, by the system level message passing module, DMA transfers of the pinned memory segments from the host computer to the accelerator.

18 Claims, 10 Drawing Sheets

U.S. PATENT DOCUMENTS

| | | | |
|---|---|---|---|
| 2007/0255802 A1* | 11/2007 | Aloni et al. | 709/217 |
| 2008/0183882 A1 | 7/2008 | Flynn et al. | |
| 2008/0256330 A1 | 10/2008 | Wang et al. | |
| 2008/0259086 A1 | 10/2008 | Doi et al. | |
| 2009/0024734 A1 | 1/2009 | Merbach et al. | |
| 2009/0080428 A1 | 3/2009 | Witkowski et al. | |
| 2009/0110326 A1 | 4/2009 | Kim et al. | |
| 2010/0153541 A1 | 6/2010 | Arimilli et al. | |

OTHER PUBLICATIONS

Ball, Stuard, Introduction to direct memory access, www.eetimes.com [online], Oct. 14, 2003 [accessed online on Nov. 12, 2010], URL: http://www.eetimes.com/discussion/other/4024879/Introduction-to-direct-memory-access.*

U.S. Appl. No. 12/204,842, filed Sep. 2008, Aho et al.
U.S. Appl. No. 12/204,352, filed Sep. 2008, Aho et al.
U.S. Appl. No. 12/204,391, filed Sep. 2008, Aho et al.
U.S. Appl. No. 12/189,342, filed Aug. 2008, Carey et al.
U.S. Appl. No. 12/358,663, filed Jan. 2009, Archer et al.
U.S. Appl. No. 12/699,162, filed Feb. 2010, Archer et al.
U.S. Appl. No. 12/362,137, filed Jan. 2009, Archer et al.
U.S. Appl. No. 12/359,383, filed Jan. 2009, Archer et al.
U.S. Appl. No. 12/361,943, filed Jan. 2009, Archer et al.
U.S. Appl. No. 12/360,930, filed Jan. 2009, Carey et al.
U.S. Appl. No. 12/364,590, filed Feb. 2009, Archer et al.
U.S. Appl. No. 12/360,158, filed Jan. 2009, Carey et al.
U.S. Appl. No. 12/537,377, filed Aug. 2009, Aho et al.
U.S. Appl. No. 12/361,910, filed Jan. 2009, Archer et al.
U.S. Appl. No. 12/428,646, filed Apr. 2009, Arroyo et al.
U.S. Appl. No. 12/771,627, filed Apr. 2010, Aho et al.
Buonadonna, Phillip, Culler, David, "Queue Pair IP: A Hybrid Architecture for System Area Networks", Aug. 7, 2002. Computer Architecture. 2002. Proceedinas. 29th Annual Symposium. pp. 247-256.
Brightwell, Rin, Doerfler, Doug, Underwood D., Keith, "A Preliminary Analysis of the Infiniband and XD1 Network Interfaces", Jun. 26, 2006, Parallel and Distribution Processing Symposium, 2006. IPDPS 2006. 20th International, p. 8.
Office Action, U.S. Appl. No. 12/189,342, filed Aug. 11, 2008.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-950.
Rabenseifner, Rolf, Some Aspects of Message-Passing on Future Hybrid Systems, www.springerlink.com [online], 2008 [accessed online on Nov. 12, 2010], URL: http://www.springerlink.com/content/m12170217065w185/.
Ball, Stuard, Introduction to direct memory access, www.eetimes.com [online], Oct. 14, 2003 [accessed online on Nov. 12, 2010], URL: http;//www.eetimes.com/discussion/other/4024879/introduction-to-direct-memory-access.
Office Action, U.S. Appl. No. 12/204,352, filed Dec. 16, 2010.
Final Office Action, U.S. Appl. No. 12/189,342, filed Dec. 23, 2010.
Office Action, U.S. Appl. No. 12/362,137, filed Nov. 22, 2010.
Office Action, U.S. Appl. No. 12/364,590, filed Nov. 26, 2010.
Office Action, U.S. Appl. No. 12/361,910, filed Nov. 19, 2010.

* cited by examiner

DIRECT MEMORY ACCESS IN A HYBRID COMPUTING ENVIRONMENT

BACKGROUND OF THE INVENTION

1. Field of the Invention

The field of the invention is data processing, or, more specifically, methods, apparatus, and products for direct memory access in a hybrid computing environment.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery.

SUMMARY OF THE INVENTION

Methods, apparatus, and products for direct memory access ('DMA') in a hybrid computing environment where the hybrid computing environment includes a host computer having a host computer architecture, an accelerator having an accelerator architecture, the accelerator architecture optimized, with respect to the host computer architecture, for speed of execution of a particular class of computing functions, the host computer and the accelerator adapted to one another for data communications by a system level message passing module. DMA in such a hybrid computing environment in accordance with embodiments of the present invention includes identifying, by the system level message passing module, a buffer of data to be transferred from the host computer to the accelerator according to a DMA protocol; segmenting, by the system level message passing module, the buffer of data into a predefined number of memory segments; pinning, by the system level message passing module, the memory segments against paging; and asynchronously with respect to pinning the memory segments, effecting, by the system level message passing module, DMA transfers of the pinned memory segments from the host computer to the accelerator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
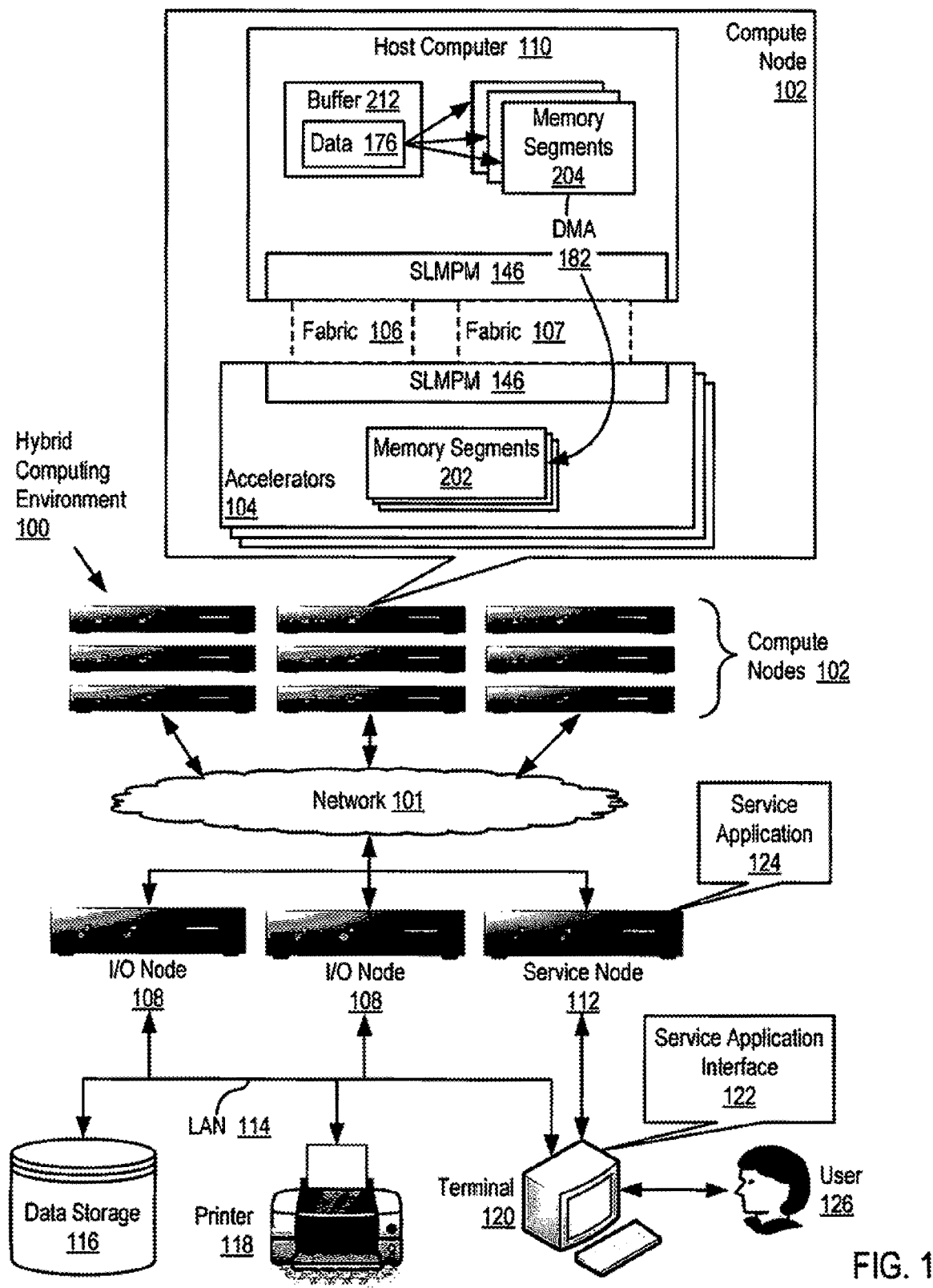
FIG. 1 sets forth a diagram of an example hybrid computing environment useful for DMA according to embodiments of the present invention.

Exemplary methods, apparatus, and products for direct memory access ('DMA') in a hybrid computing environment according to embodiments of the present invention are described with reference to the accompanying drawings, beginning with FIG. 1. FIG. 1 sets forth a diagram of an example hybrid computing environment (100) useful for DMA according to embodiments of the present invention. A 'hybrid computing environment,' as the term is used in this specification, is a computing environment in that it includes computer processors operatively coupled to computer memory so as to implement data processing in the form of execution of computer program instructions stored in the memory and executed on the processors. In addition, the hybrid computing environment (100) in the example of FIG. 1 includes at least one host computer having a host architecture that operates in cooperation with an accelerator having an accelerator architecture where the host architecture and accelerator architecture are different architectures. The host and accelerator architectures in this example are characterized by architectural registers, registers that are accessible by computer program instructions that execute on each architecture, registers such as, for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment.

Examples of hybrid computing environments include a data processing system that in turn includes one or more host computers, each having an x86 processor, and accelerators whose architectural registers implement the PowerPC instruction set.

Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol ('IP'), PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes in the example of FIG. 1 includes a host computer and an accelerator, readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, may be viewed as composed of nine separate, smaller hybrid computing environments, one for each compute node, which taken together form the hybrid computing environment (100) of FIG. 1.

Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module or library of computer program instructions that exposes an application programming interface ('API') to user-level applications for carrying out message-based data communications between the host computer (110) and the accelerator (104). Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body, the Data Communication and Synchronization interface ('DACS') of the LANL supercomputer, the POSIX Threads library ('Pthreads'), an IEEE standard for distributed, multithreaded processing, the Open Multi-Processing interface ('OpenMP'), an industry-sanctioned specification for parallel programming, and other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments capable of DMA according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

The example hybrid computing environment (100) of FIG. 1 is configured for DMA according to embodiments of the present invention. As explained below in more detail, DMA as the term is used in this specification is a data communications protocol for passing data between a host computer and an accelerator with reduced operational burden on computer processor of the host computer and accelerator. The SLMPM (146) in the example hybrid computing environment (100) of FIG. 1 operates generally for DMA in the hybrid computing environment (100) by identifying, by the SLMPM (146), a buffer (212) of data (176) to be transferred from the host computer (110) to the accelerator (104) according to a DMA protocol (182); segmenting, by the SLMPM (146), the buffer (212) of data (176) into a predefined number of memory segments (204); pinning, by the SLMPM (146), the memory segments (204) against paging; and asynchronously with respect to pinning the memory segments (204), effecting, by the SLMPM (146), DMA (182) transfers of the pinned memory segments (204) from the host computer (110) to the accelerator (104). The accelerator (104) in the example hybrid computing environment (100) of FIG. 1 may receive through the SLMPM (146) the DMA transfers in memory segments (202) which may also be pinned against paging.

Figure 2:
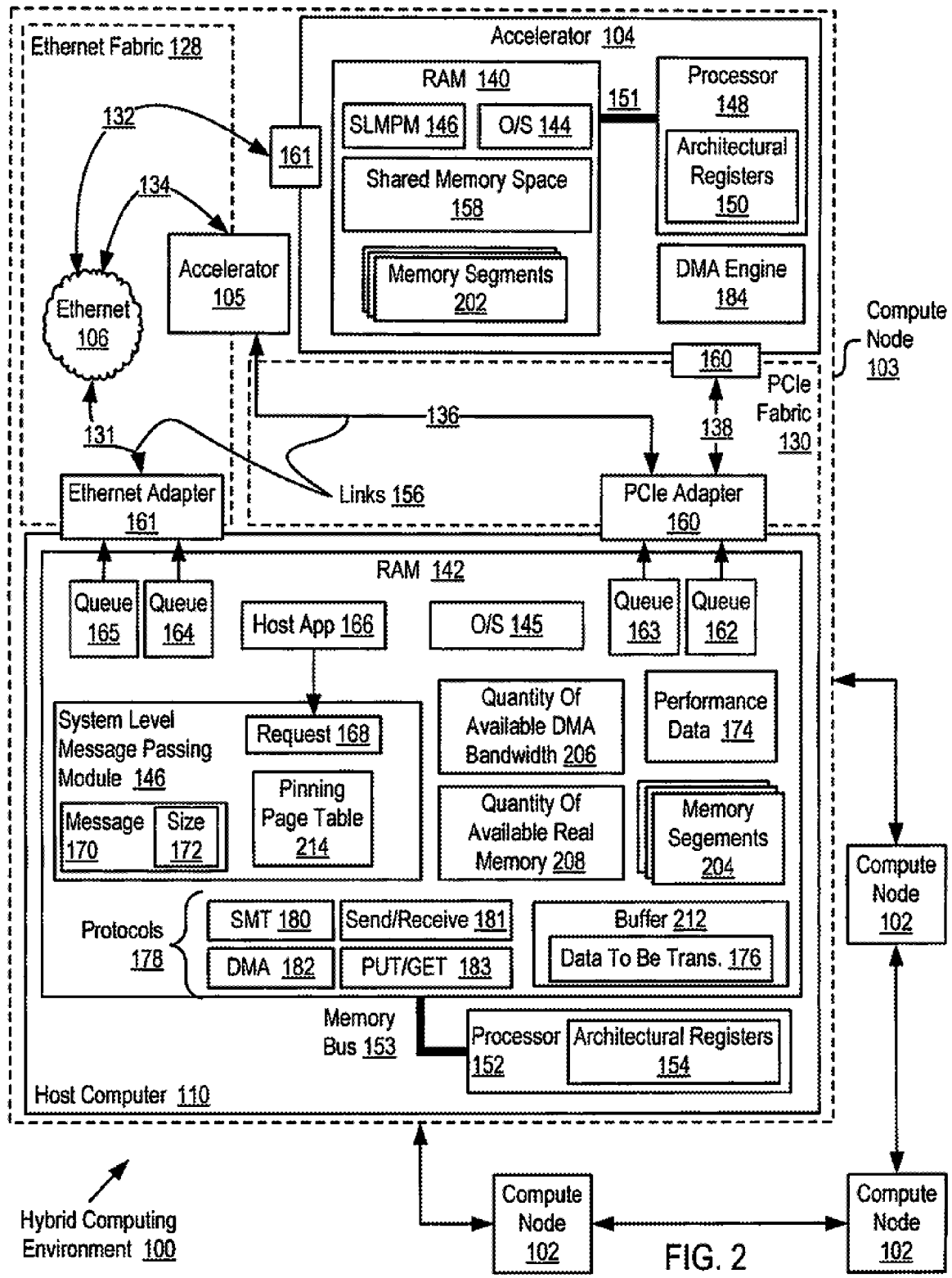
FIG. 2 sets forth a block diagram of an exemplary hybrid computing environment useful for DMA according to embodiments of the present invention.

For further explanation, FIG. 2 sets forth a block diagram of an exemplary hybrid computing environment (100) useful for DMA according to embodiments of the present invention. The hybrid computing environment (100) of FIG. 2 includes four compute nodes. Similar to the compute nodes of FIG. 1, each of the compute nodes in the example of FIG. 2 may represent a small, separate hybrid computing environment which taken together make up a larger hybrid computing environment. One compute node (103) in the example of FIG. 2 is illustrated in an expanded view to aid a more detailed explanation of such a hybrid computing environment (100). As shown in the expanded view of compute node (103), each of the compute nodes (102, 103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

Each of the compute nodes also includes one or more accelerators (104, 105). Each accelerator (104, 105) includes a computer processor (148) operatively coupled to RAM (140) through a high speed memory bus (151). Stored in RAM (140,142) of the host computer and the accelerators (104, 105) is an operating system (145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160) and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2, may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data resides in memory at any time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer initiates a DMA transfer of data from the host to the accelerator by sending a message according to the SMT protocol to the accelerator, instructing the accelerator to perform a remote 'GET' operation. The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the application program (166) executes on two or more host computers (110) in the parallel computing environment. In such embodiments, monitoring data communications performance across data communications modes may also include aggregating data communications performance information (174) across a plurality of instances of the application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 receives, from an application program (166) on the host computer (110), a request (168) to transmit data (176) according to a data communications mode from the host computer (110) to the accelerator (104). Such data (176) may include computer program instructions compiled for execution by the accelerator (104), work piece data for an application program executing on the accelerator (104), or some combination of computer program instructions and work piece data. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded according to embodiments of the present invention, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded according to embodiments of the present invention to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also determines, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments, where monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments, where monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The example hybrid computing environment (100) of FIG. 2 is configured for DMA in accordance with embodiments of the present invention. The SLMPM (146) in the example of FIG. 2 operates generally for DMA in the hybrid computing environment (100) by identifying a buffer (212) of data (176) to be transferred from the host computer (110) to the accelerator (104) according to a DMA protocol (182); segmenting the buffer (212) of data (176) into a predefined number of memory segments (204); pinning the memory segments (204) against paging; and asynchronously with respect to pinning the memory segments (176), effecting DMA transfers of the pinned memory segments (204) from the host computer (110) to the accelerator.

The SLMPM (146) in the example hybrid computing environment (100) of FIG. 2 may identify a buffer (212) of data (176) to be transferred from the host computer (110) to the accelerator (104) according to a DMA protocol (182) by receiving a call from a host application program (166) through an API to a data communications function provided by the SLMPM (146) where the call includes arguments such as a memory location and offset of the buffer (212) of data (176) to be transferred and an identity of accelerator to which the data is to be transferred. The combination of a memory location and offset specifies the length or size of the buffer of data. Consider as an example of such a call to a library function provided by an SLMPM implemented as a DACS-like library, the function call dacs_send (0x1000, 0x10000, AccelID_01). This example call to a DACS-like SLMPM (146) includes a beginning memory address of a buffer of data, 0x-1000, an offset that defines the length of the buffer at memory address 0x10000, and an identify of an accelerator, AccelID_01, to which the data in the buffer is to be transferred. A buffer is a region of memory used to temporarily hold data which is moved from one place to another, here from the host computer (110) to the accelerator (104). As mentioned above, data to be transferred from the host computer (110) to the accelerator (104) may include computer program instructions compiled for execution by the accelerator (104), work piece data for an application program executing on the accelerator (104), some combination of computer program instructions and work piece data, or other data as will occur to readers of skill in the art.

The SLMPM (146) in the example hybrid computing environment (100) of FIG. 2 may segment the buffer (212) of data (176) into a predefined number of memory segments (204) in various ways including dividing the data into memory segments of equal size. A memory segment as the term is used in this specification refers to a virtual memory address or a range virtual memory addresses used by user-level applications to access data in memory locations. Consider, as an example of dividing the data in the buffer into memory segments of equal size, that a buffer (212) of data (176) to be transferred from the host computer (110) to the accelerator is one megabyte ('MB') in size, and that the predefined number of memory segments (204) is 64. In such an example, the buffer of data may be segmented into 64 segments of 16 kilobytes ('KB') each. Dividing the data in the buffer into memory segments of equal size may include filling the last memory segment with zeros, ones, a checksum, or other binary pattern if the memory segment is a greater size than the amount of data in the buffer remaining to be segmented. Consider that the amount of data in the buffer remaining to be segmented is 8 KB and the size of the memory segments is 16 KB. The last 8 KB of the final memory segment may be filled with ones, zeros, a checksum, or some other specified binary pattern as will occur to those of skill in the art.

The SLMPM (146) in the example hybrid computing environment (100) of FIG. 2 may pin the memory segments (204) against paging by executing, for each memory segment, a system call to the operating system (145) to register the virtual memory addresses of the memory segment (204). Pinning is a process effected by an operating system (145) for a virtual address or range of virtual addresses that insures those virtual addresses are not paged from primary computer memory, such as RAM, to an alternative computer memory, such as a hard disk drive, which typically requires greater time to access than the primary computer memory. That is, in some embodiments, a pinned virtual address is always mapped to a real physical address in RAM. Pinning, however, is an expensive, processor intensive operation that requires a large amount of time to carry out in relation to the execution of other computer program instructions or processes. In some hybrid computing environments (100), for example, one or more shared memory transfers may be effected in the time required to pin one memory segment. Pinning a memory segment also removes the physical addresses mapped to a pinned memory segment from reallocation by the operating system as virtual addresses. That is, once a memory segment is pinned, the amount of available computer memory resources for virtual address management is reduced.

Pinning memory segments (204) against paging may also include updating a pinning page table (214) or tables. The SLMPM (146) in some example hybrid computing environments configured for DMA according to embodiments of the present invention maintains a pinning page table (214) or tables that are updated upon each system call to the operating system (145) to register memory addresses. A pinning page table as the term is used in this specification reflects currently registered memory segments. In some embodiments the pinning page table may be one or more tables of limited size, that is, having a limited number of entries where each entry may associate a memory segment and a handle representing the physical memory addresses to which the memory segment is mapped. In some example hybrid computing environments configured for DMA in accordance with embodiments of the present invention, the number of entries in a pinning page table is used by the SLMPM to limit the maximum number of memory segments which may be pinned at any given time. That is, in a pinning page table having 64 entries, only 64 memory segments may be pinned at any given time. The SLMPM (146) maintains the pinning page table by adding an association of a handle and a virtual address range upon each system call to register a memory segment, removing the association of memory segments and physical address when the registration is removed, and if all entries in the pinning page table (214) reflect a pinned memory segment, replacing a least recently used memory segment in the pinning page table with a newly pinned memory segment including executing a system call to remove registration of the least recently used memory segment. In this way, the number of a memory segments pinned from paging is limited, providing efficient resource allocation and use of physical memory available for use in virtual memory management.

As mentioned above, pinning a memory segment is an expensive, processor intensive, time-consuming operation. Reducing the expense of such a time consuming operation optimizes efficiency and speed of a DMA transfer of a buffer (212) of data (176) in a hybrid computing environment where such a DMA transfer may include many pinning operations. To reduce such expense the SLMPM (146) in the example hybrid computing environment (100) of FIG. 2 may effect DMA transfers of the pinned memory segments (204) from the host computer (110) to the accelerator asynchronously with respect to pinning the memory segments (176). The SLMPM (146) may effect DMA transfers of the pinned memory segments (204) asynchronously with respect to pinning the memory segments (176) by carrying out processes and operations in parallel with pinning operations. Carrying out processes and operations in parallel with the pinning operations in a DMA transfer is one way to reduce the expense and effect that such pinning operations have on a DMA transfer of a buffer of data in a hybrid computing environment.

Consider, for clarity of explanation, the following example DMA transfer carried out in the hybrid computing environment (100) of FIG. 2 in accordance with embodiments of the present invention where the expense of pinning process is masked or reduced by carrying out other processes in parallel with pinning operations. The SLMPM (146) running on the host computer (110) receives a call from a host application program (166) through an API to a data communications function provided by the SLMPM (146) where the call includes arguments such as a memory location and offset of the buffer (212) of data (176) to be transferred and an identity of accelerator (104) to which the data is to be transferred. Upon receiving the call, the SLMPM (146) on the host computer (110) segments the buffer into a predefined number of memory segments (204) and sends to the accelerator (104) through a non-DMA protocol, such as the SMT protocol (180), a ready-to-send data communications message ('RTS'). An RTS as the term is used here is a data communications message sent by the SLMPM running on the host computer to the SLMPM running on the accelerator for each memory segment of data to be transferred to the accelerator. The RTS notifies the SLMPM (146) running on the accelerator (104) of a DMA transfer to be carried out. Each RTS includes a range of memory addresses from which the DMA engine (184) of the accelerator is to retrieve data. The first RTS sent in a DMA transfer of a buffer of data that includes multiple memory segments identifies the length of each segment and the total length of data to be transferred. Upon receiving an RTS, the SLMPM (146) running on the accelerator may allocate and pin memory regions (202) in which to receive the transferred data. Such pinning may be carried out in accordance with embodiments of the present invention at any time after receiving the first RTS indicating a DMA transfer of multiple memory segments. In fact, the SLMPM (146) running on the accelerator may use the DMA engine (184) to retrieve data from the memory region specified in one RTS into a previously pinned memory region while pinning a memory region for a subsequent RTS. That is, in embodiments of the present invention, the SLMPM (146) running on the accelerator may execute remote 'GET' operations with a DMA engine in parallel with pinning memory regions for receiving data retrieved in remote 'GET' operations. The so-called 'expense' of the time-consuming and processor intensive pinning is therefore masked or reduced on the accelerator when executing DMA transfers according to embodiments of the present invention. The SLMPM (146) running on the host computer (110) may, in a similar manner, send an RTS for a DMA transfer of a first memory segment in parallel with pinning a subsequent memory segment. That is, the so-called 'expense' of the time-consuming and processor intensive pinning is masked or reduced on the host computer (110) when executing DMA transfers according to embodiments of the present invention. In addition to sending an RTS for a DMA transfer of a first memory segment in parallel with pinning a subsequent memory segment, the time-consuming and processor intensive process of pinning a memory region by the SLMPM (146) running on the host computer (110), may be carried out in parallel with a GET operation carried out by the DMA engine as the behest of the SLMPM running on the accelerator. That is, the so-called expense of the time consuming and processor intensive pinning process carried out by the SLMPM on the host computer is masked or reduced, not only on the host computer, but for DMA transfers generally. After the DMA engine (184) of the accelerator (104) retrieves all data for a particular memory segment through a remote 'GET' DMA operation, the SLMPM (146) of the accelerator sends an acknowledgement ('ACK') to the host computer indicating that the DMA transfer for that particular memory segment is complete.

DMA in some hybrid computing environments (100) configured in accordance with embodiments of the present invention may include specifying, by the SLMPM (146), the number of memory segments in dependence upon a quantity (208) of available real memory, a quantity of available pinning resources, depicted here as the pinning page table (214), and a quantity (206) of available DMA bandwidth. As mentioned above, physical memory resources in some hybrid computing environments configured for DMA according to embodiments of the present invention may be scarce. As such, pinning memory addresses removes those addresses from available virtual memory management in the operating system, the addresses cannot be paged out or reused by the operating system. The number of memory segments then may be specified such that the possible number of memory segments pinned at the any time is as small as possible yet provides efficiency in DMA between the host computer and the accelerator. The SLMPM (146) may specify a number of memory segments in dependence upon the pinning page table (214) by insuring that each memory segments may be pinned. If only three entries are available, for example, the SLMPM (146) may specify only three memory segments. The SLMPM (146) may specify a number of memory segments in dependence upon the quantity (206) of available DMA bandwidth such that the 'masking' effect described above, provided by pinning memory segments in parallel with carrying out other DMA processing as explained above, is optimized. In many hybrid computing environments, the smaller the number of memory segments, the less DMA bandwidth is occupied by transfers of memory segments for a particular buffer of data and the 'masking' effect of pinning memory regions in parallel with carrying out other DMA processing is reduced.

DMA in some hybrid computing environments (100) configured in accordance with embodiments of the present invention may include specifying, by the SLMPM (146), a size of the memory segments in dependence upon the time required to pin a memory segment and the time required to effect a DMA transfer of a memory segment. Specifying, by the SLMPM (146), a size of the memory segments in dependence upon the time required to pin a memory segment and the time required to effect a DMA transfer of a memory segment may be carried out by specifying the size such that the time to pin a memory segment and the time required to effect a DMA transfer of a memory segment are similar, but with the time to pin smaller than the DMA time. That is, if a DMA engine (184) on the accelerator (104) retrieves data from a memory region for a first DMA transfer while the SLMPM (146) on the host computer (110) simultaneously pins a memory region for a subsequent DMA transfer, the DMA engine (184) need not wait to retrieve data from a subsequent memory region because the pinning will complete before the retrieval of data in the first DMA transfer completes.

From time to time in some hybrid computing environments configured for DMA according to embodiments of the present invention, the SLMPM (146), either on the host computer (110) or accelerator (104), may fail to pin a memory segment. When the SLMPM fails to pin a memory segment there the SLMPM may carry out the transfer of data in various ways. In hybrid computing environments (100) in which the SLMPM (146) fails to pin a first memory segment (204) on the host computer (110) for a DMA transfer from the host computer (110) to the accelerator (104), for example, the SLMPM (146) may send, from the host computer to the accelerator, all data (176) in the buffer according to a data communications protocol other than the DMA protocol (182), such as the SMT protocol (180). That is, if the SLMPM (146) cannot pin a memory segment for a first DMA transfer of a data in a buffer, the SLMPM transfers the data through an alternative, non-DMA protocol. Failing to pin a first memory segment (204) on the host computer (110) for a DMA transfer may include determining that the quantity (206) of available real memory (208) is below a predetermined threshold.

In hybrid computing environments (100) in which the SLMPM (146) fails to pin a memory segment on the host computer for a second or later DMA transfer from the host computer to the accelerator the SLMPM (146) may send, from the host computer (110) to the accelerator (104), according to a data communications protocol other than the DMA protocol (182), data only from the memory segment (204) which failed to pin. That is, the SLMPM sends data from only one memory segment that failed to pin to the accelerator through an alternative, non-DMA protocol—not all remaining memory segments of data to be subsequently transferred. Instead, when transferring data from a subsequent memory segment, the SLMPM (146) again attempts to pin the subsequent memory segment.

In hybrid computing environments (100) in which the SLMPM (146) fails to pin a memory segment on the accelerator for a particular DMA transfer from the host computer to the accelerator the SLMPM (146) may send, from the host computer according to a data communications protocol other than the DMA protocol, data only for the particular DMA transfer for which the segment failed to pin. Failing to pin a memory segment on the accelerator (104) for a particular DMA transfer from the host computer (110) to the accelerator (104) includes sending by an instance of the SLMPM (146) running on the accelerator (104) to an instance running on the host computer (110) a negative acknowledgement ('NACK') for the particular DMA transfer for which the pin failed. Responsive to the NACK the instance of the SLMPM (146) on the host computer (110) may send the data from the particular DMA transfer for which the pinning failed, to the accelerator through an alternative, non-DMA protocol, such as the SMT protocol for example.

Figure 3:
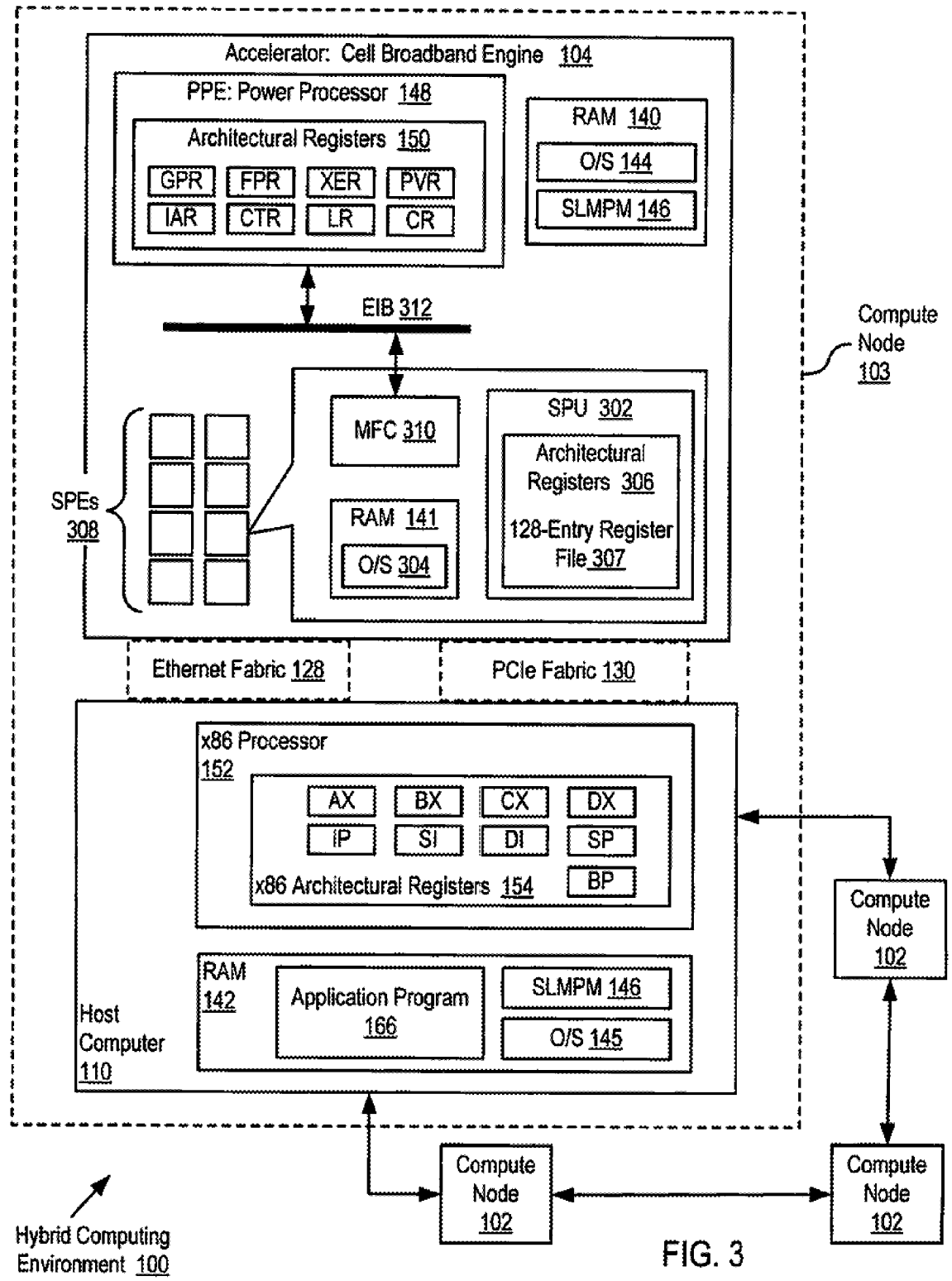
FIG. 3 sets forth a block diagram of a further exemplary hybrid computing environment useful for DMA according to embodiments of the present invention.

For further explanation, FIG. 3 sets forth a block diagram of a further exemplary hybrid computing environment (100) useful for DMA according to embodiments of the present invention. The hybrid computing environment of FIG. 3 is similar the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalem™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register ('DX'), a source index register for string operations ('SI'), a destination index for string operations ('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multi-threaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a lightweight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The example hybrid computing environment (100) of FIG. 3 may be configured for DMA according to embodiments of the present invention. The SLMPM (146) in the example of FIG. 3 may operate generally for such DMA by identifying a buffer of data to be transferred from the host computer (110) to the accelerator (104) according to a DMA protocol; segmenting the buffer of data into a predefined number of memory segments; pinning the memory segments against paging; and asynchronously with respect to pinning the memory segments, effecting DMA transfers of the pinned memory segments from the host computer to the accelerator.

Figure 4:
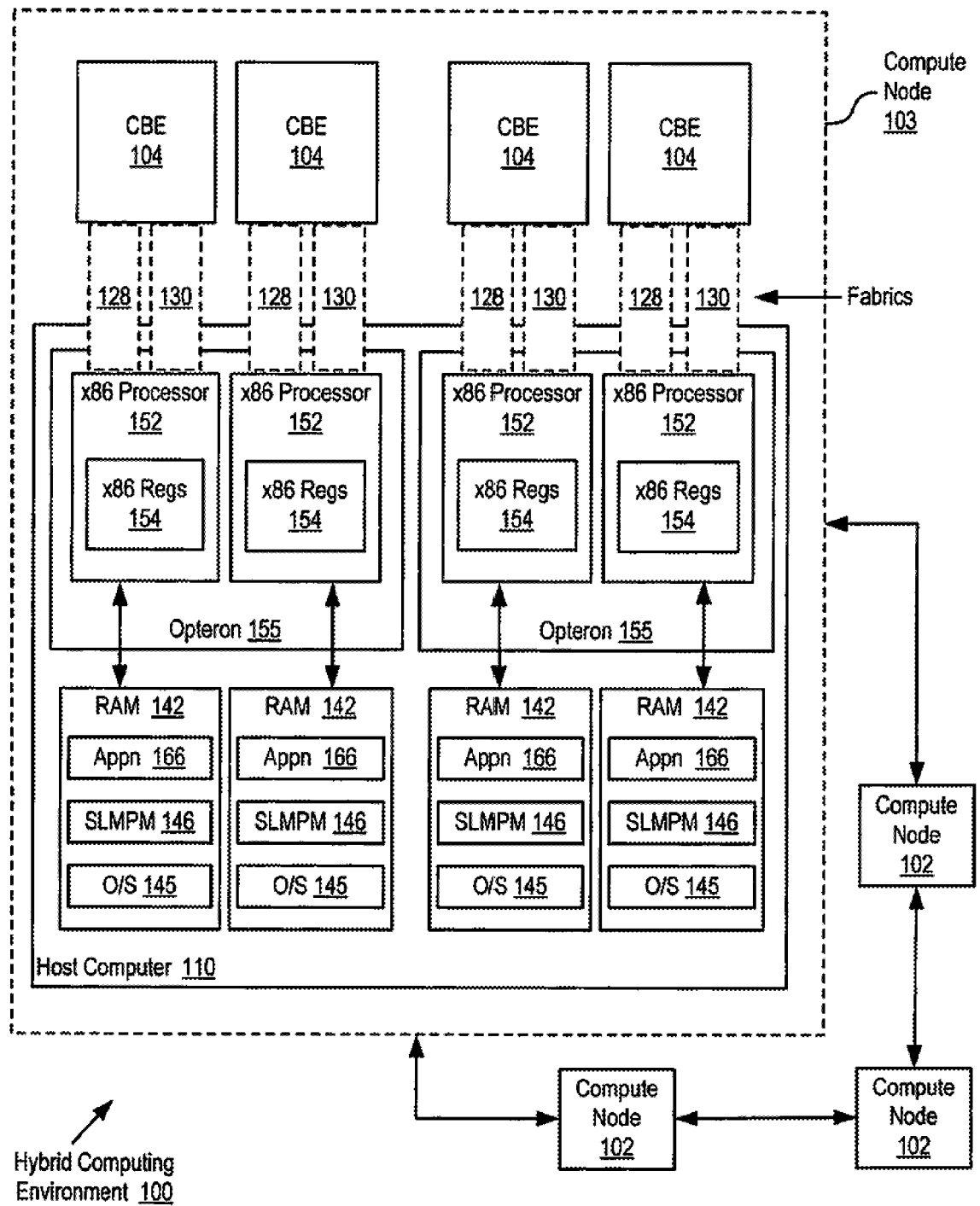
FIG. 4 sets forth a block diagram of a further exemplary hybrid computing environment useful for DMA according to embodiments of the present invention.

For further explanation, FIG. 4 sets forth a block diagram of a further exemplary hybrid computing environment (100) useful for DMA according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The example hybrid computing environment (100) of FIG. 4 may be configured for DMA according to embodiments of the present invention. Any SLMPM (146) in the example of FIG. 4 may operate generally for such DMA by identifying a buffer of data to be transferred from the host computer (110) to the accelerator (104) according to a DMA protocol; segmenting the buffer of data into a predefined number of memory segments; pinning the memory segments against paging; and asynchronously with respect to pinning the memory segments, effecting DMA transfers of the pinned memory segments from the host computer to the accelerator.

Figure 5:
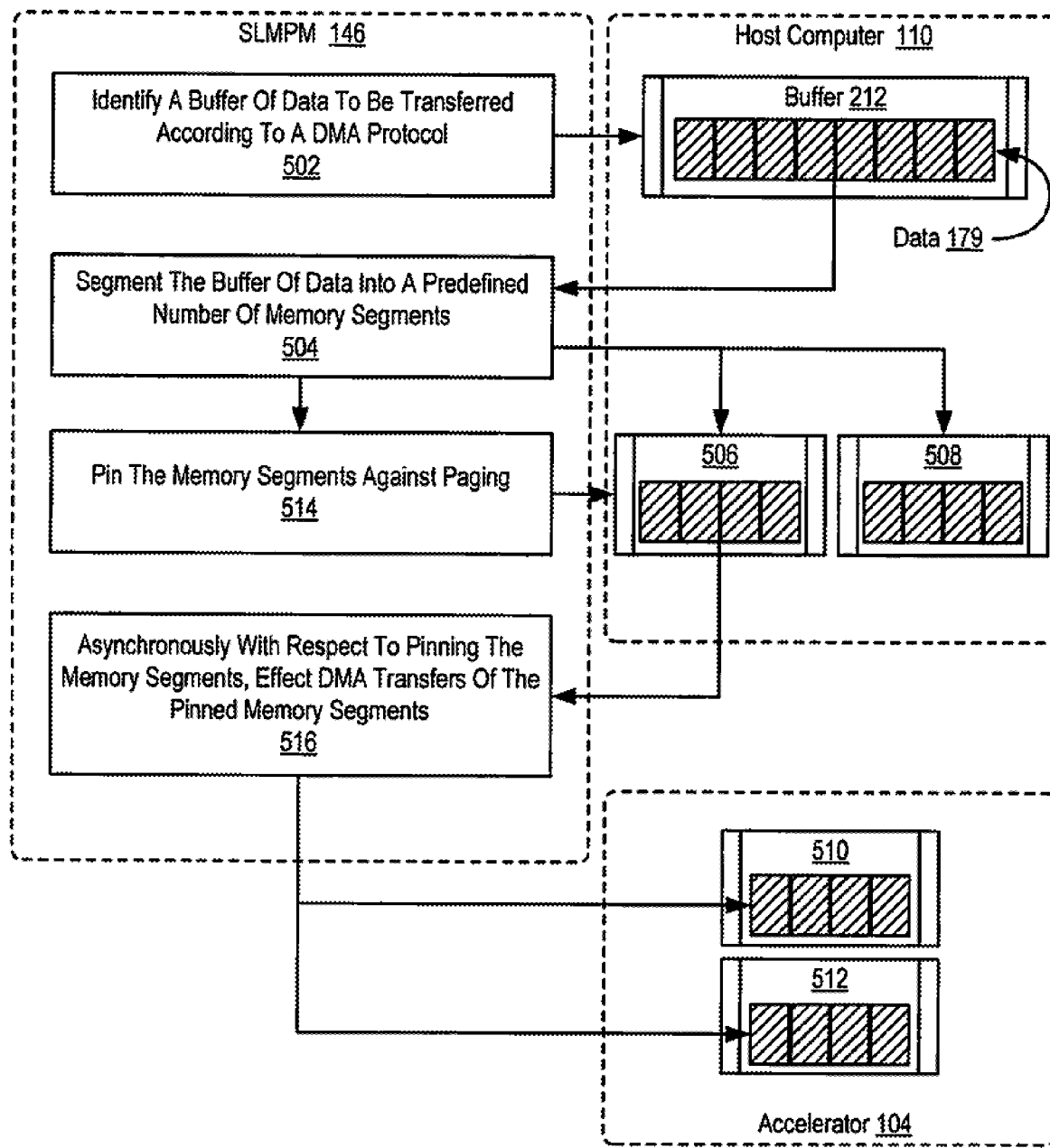
FIG. 5 sets forth a flow chart illustrating an exemplary method for DMA in a hybrid computing environment according to embodiments of the present invention.

For further explanation, FIG. 5 sets forth a flow chart illustrating an exemplary method for DMA in a hybrid computing environment according to embodiments of the present invention. The method of FIG. 5 is carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types. The method of FIG. 5 includes identifying (502), by the system level message passing module (146), a buffer (212) of data (179) to be transferred from the host computer (110) to the accelerator (104) according to a DMA protocol. The method of FIG. 5 also includes segmenting (504), by the system level message passing module (146), the buffer (212) of data (176) into a predefined number of memory segments (506, 508). The method of FIG. 5 also includes pinning (514), by the system level message passing module (146), the memory segments (506, 508) against paging. The method of FIG. 5 also include asynchronously with respect to pinning the memory segments, effecting (516), by the system level message passing module (146), DMA transfers of the pinned memory segments (506, 508) from the host computer (110) to memory segments (510, 512) on the accelerator (104). The memory segments (510, 512) on the accelerator may also be pinned, by an instance of the SLMPM executing on the accelerator (104), from paging asynchronously with respect to effecting DMA transfers.

Figure 6:
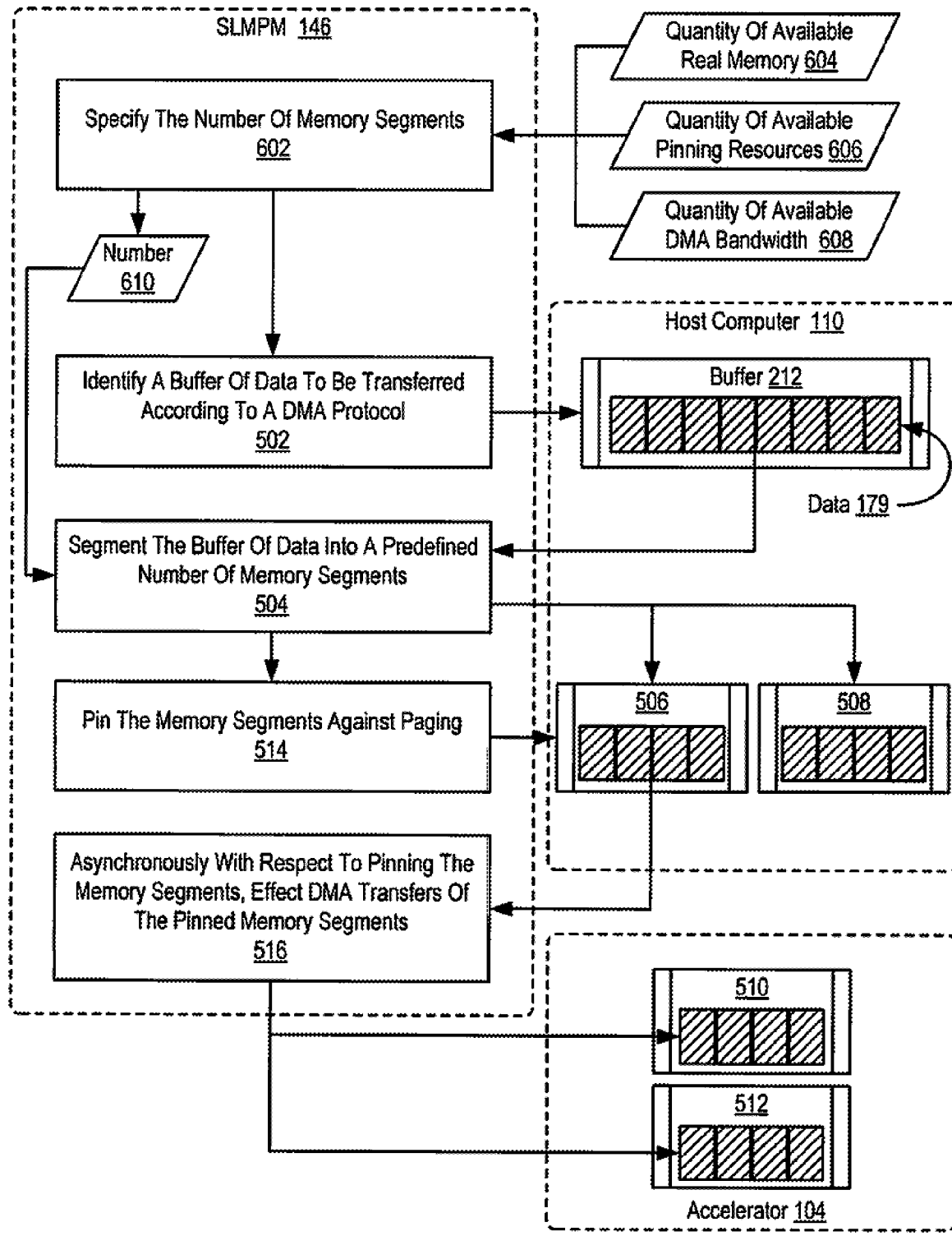
FIG. 6 sets forth a flow chart illustrating a further exemplary method of DMA in a hybrid computing environment according to embodiments of the present invention.

For further explanation, FIG. 6 sets forth a flow chart illustrating a further exemplary method of DMA in a hybrid computing environment according to embodiments of the present invention. The method of FIG. 6, like the method of FIG. 5 is carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types. The method of FIG. 6 is similar to the method of FIG. 5 including, as it does, the system level message passing module's identifying (502) a buffer (212) of data (179) to be transferred from the host computer (110) to the accelerator (104) according to a DMA protocol; segmenting (504) the buffer (212) of data (176) into a predefined number of memory segments (506, 508); pinning (514) the memory segments (506, 508) against paging; and asynchronously with respect to pinning the memory segments, effecting (516) DMA transfers of the pinned memory segments (506, 508) from the host computer (110) to memory segments (510, 512) on the accelerator (104). The method of FIG. 6 differs from the method of FIG. 5, however, in that the method of FIG. 6 includes specifying (602), by the system level message passing module (146), the number (610) of memory segments (506, 508) in dependence upon a quantity (604) of available real memory, a quantity (606) of available pinning resources, and a quantity (608) of available DMA bandwidth.

Figure 7:
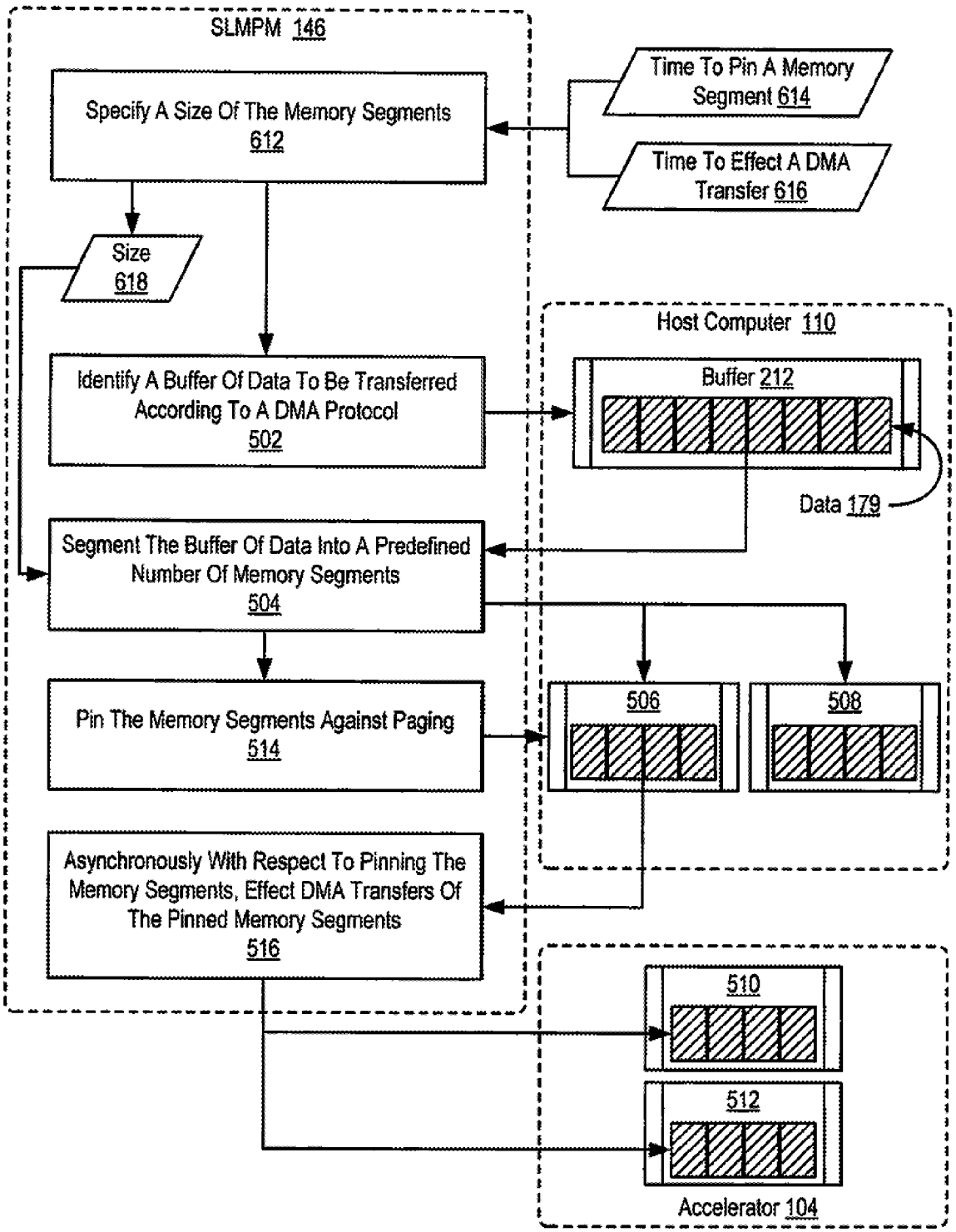
FIG. 7 sets forth a flow chart illustrating a further exemplary method of DMA in a hybrid computing environment according to embodiments of the present invention.

For further explanation, FIG. 7 sets forth a flow chart illustrating a further exemplary method of DMA in a hybrid computing environment according to embodiments of the present invention. The method of FIG. 7, like the method of FIG. 5 is carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types. The method of FIG. 7 is similar to the method of FIG. 5 including, as it does, the system level message passing module's identifying (502) a buffer (212) of data (179) to be transferred from the host computer (110) to the accelerator (104) according to a DMA protocol; segmenting (504) the buffer (212) of data (176) into a predefined number of memory segments (506, 508); pinning (514) the memory segments (506, 508) against paging; and asynchronously with respect to pinning the memory segments, effecting (516) DMA transfers of the pinned memory segments (506, 508) from the host computer (110) to memory segments (510, 512) on the accelerator (104). The method of FIG. 7 differs from the method of FIG. 5, however, in that the method of FIG. 7 includes specifying (612), by the system level message passing module (146), a size (618) of the memory segments (506, 508) in dependence upon the time (614) required to pin a memory segment and the time (616) required to effect a DMA transfer of a memory segment.

Figure 8:
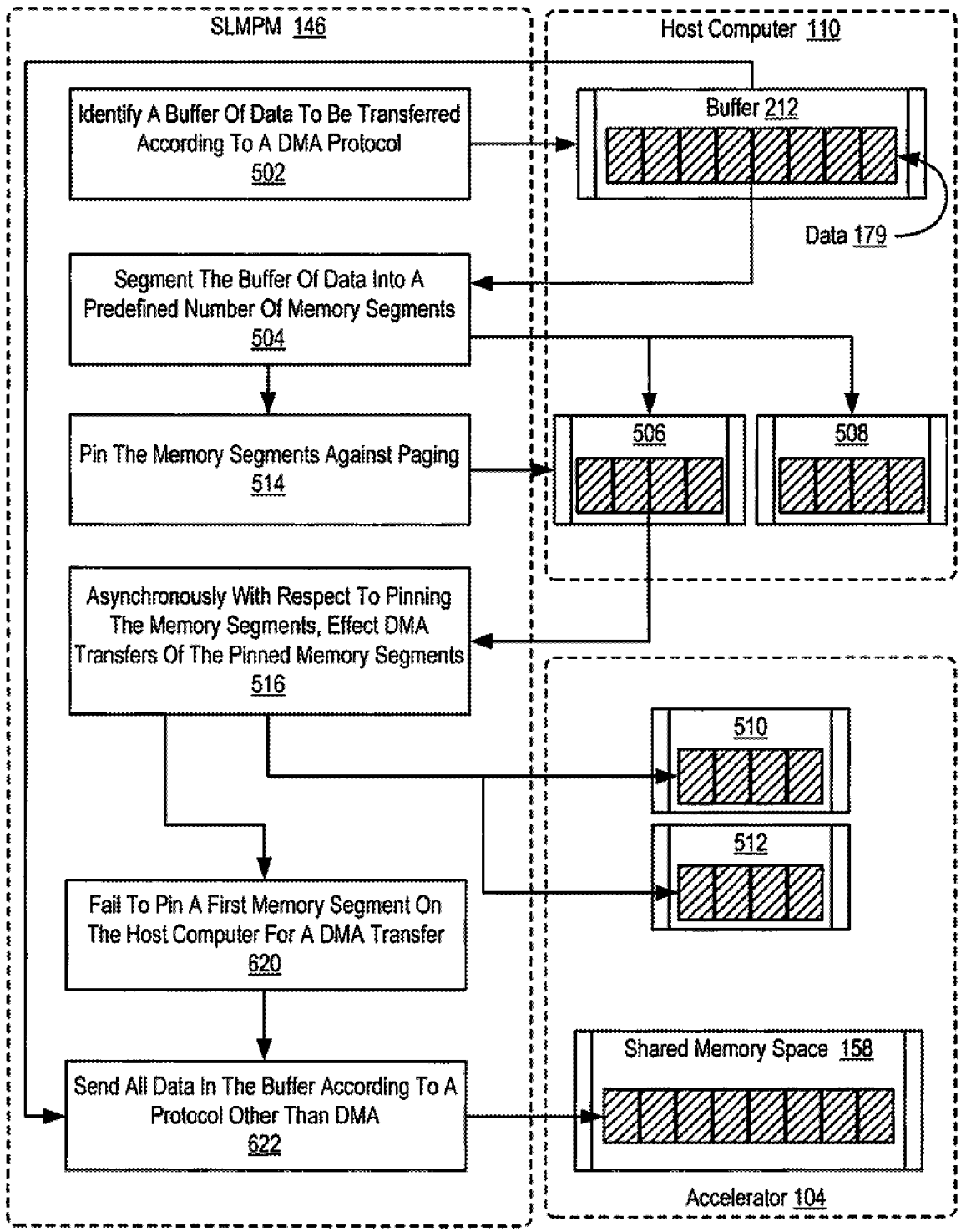
FIG. 8 sets forth a flow chart illustrating a further exemplary method of DMA in a hybrid computing environment according to embodiments of the present invention.

For further explanation, FIG. 8 sets forth a flow chart illustrating a further exemplary method of DMA in a hybrid computing environment according to embodiments of the present invention. The method of FIG. 8, like the method of FIG. 5 is carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types. The method of FIG. 8 is similar to the method of FIG. 5 including, as it does, the system level message passing module's identifying (502) a buffer (212) of data (179) to be transferred from the host computer (110) to the accelerator (104) according to a DMA protocol; segmenting (504) the buffer (212) of data (176) into a predefined number of memory segments (506, 508); pinning (514) the memory segments (506, 508) against paging; and asynchronously with respect to pinning the memory segments, effecting (516) DMA transfers of the pinned memory segments (506, 508) from the host computer (110) to memory segments (510, 512) on the accelerator (104). The method of FIG. 8 differs from the method of FIG. 5, however, in that the method of FIG. 8 includes failing (620), by the system level message passing module (146), to pin a first memory segment on the host computer (110) for a DMA transfer from the host computer (110) to the accelerator (104) and sending (622), by the system level message passing module (146) from the host computer (110) to the accelerator (104), all data in the buffer (212) according to a data communications protocol other than the DMA protocol. In the method of FIG. 8, the SLMPM (146) sends all the data in the buffer (212) to shared memory space (158) on the accelerator (104) according to a share memory transfer data communications protocol.

Figure 9:
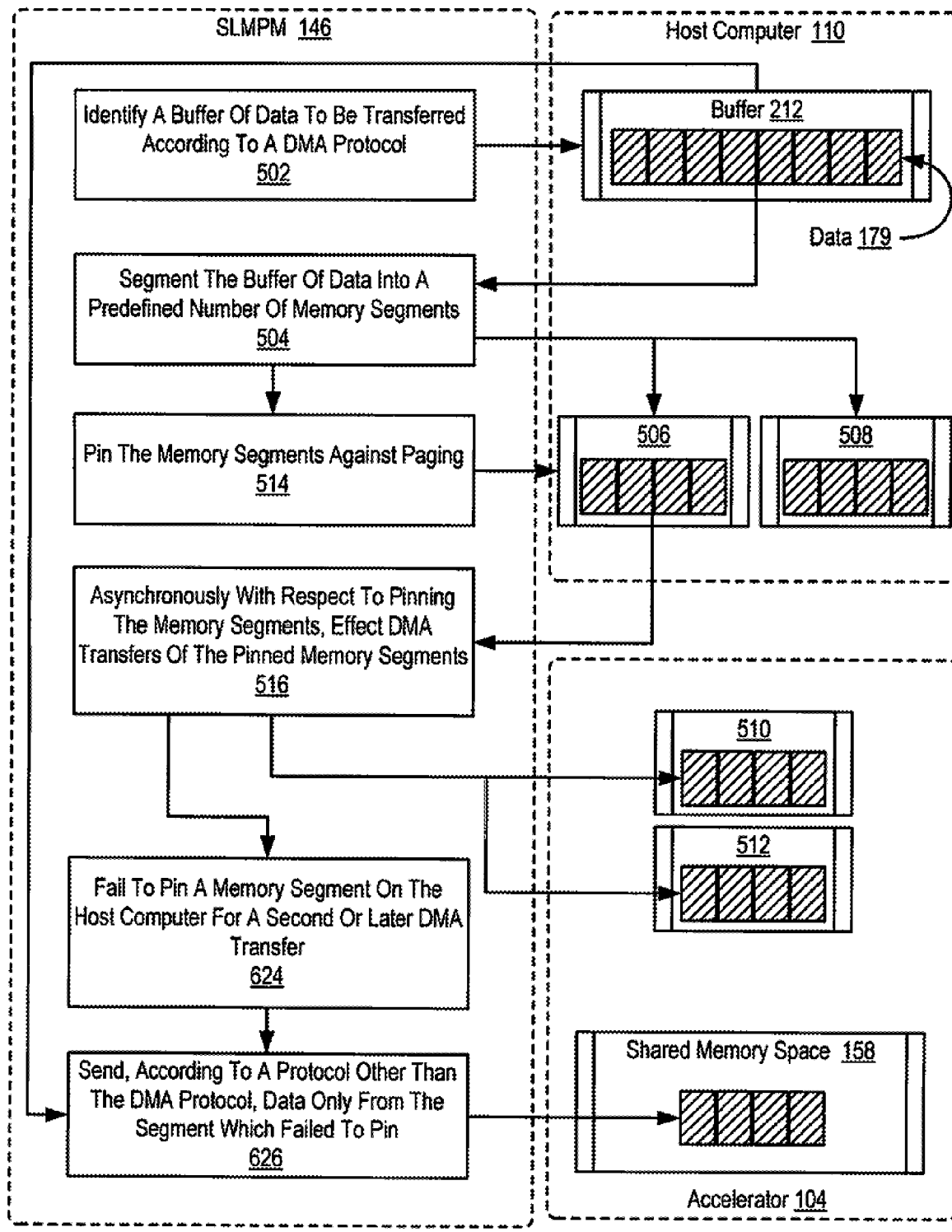
FIG. 9 sets forth a flow chart illustrating a further exemplary method of DMA in a hybrid computing environment according to embodiments of the present invention.

For further explanation, FIG. 9 sets forth a flow chart illustrating a further exemplary method of DMA in a hybrid computing environment according to embodiments of the present invention. The method of FIG. 9, like the method of FIG. 5 is carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types. The method of FIG. 9 is similar to the method of FIG. 5 including, as it does, the system level message passing module's identifying (502) a buffer (212) of data (179) to be transferred from the host computer (110) to the accelerator (104) according to a DMA protocol; segmenting (504) the buffer (212) of data (176) into a predefined number of memory segments (506, 508); pinning (514) the memory segments (506, 508) against paging; and asynchronously with respect to pinning the memory segments, effecting (516) DMA transfers of the pinned memory segments (506, 508) from the host computer (110) to memory segments (510, 512) on the accelerator (104). The method of FIG. 9 differs from the method of FIG. 5, however, in that the method of FIG. 9 includes failing (624), by the system level message passing module (146), to pin a memory segment on the host computer (110) for a second or later DMA transfer from the host computer (104) to the accelerator (104) and sending (626), by the system level message passing module (146) from the host computer (110) to the accelerator (104), according to a data communications protocol other than the DMA protocol, data only from the segment which failed to pin. In the example of FIG. 9, the SLMPM (146) sends (626) data only from the segment which failed to pin to a shared memory space (158) the accelerator (104) according to a shared memory transfer data communications protocol.

Figure 10:
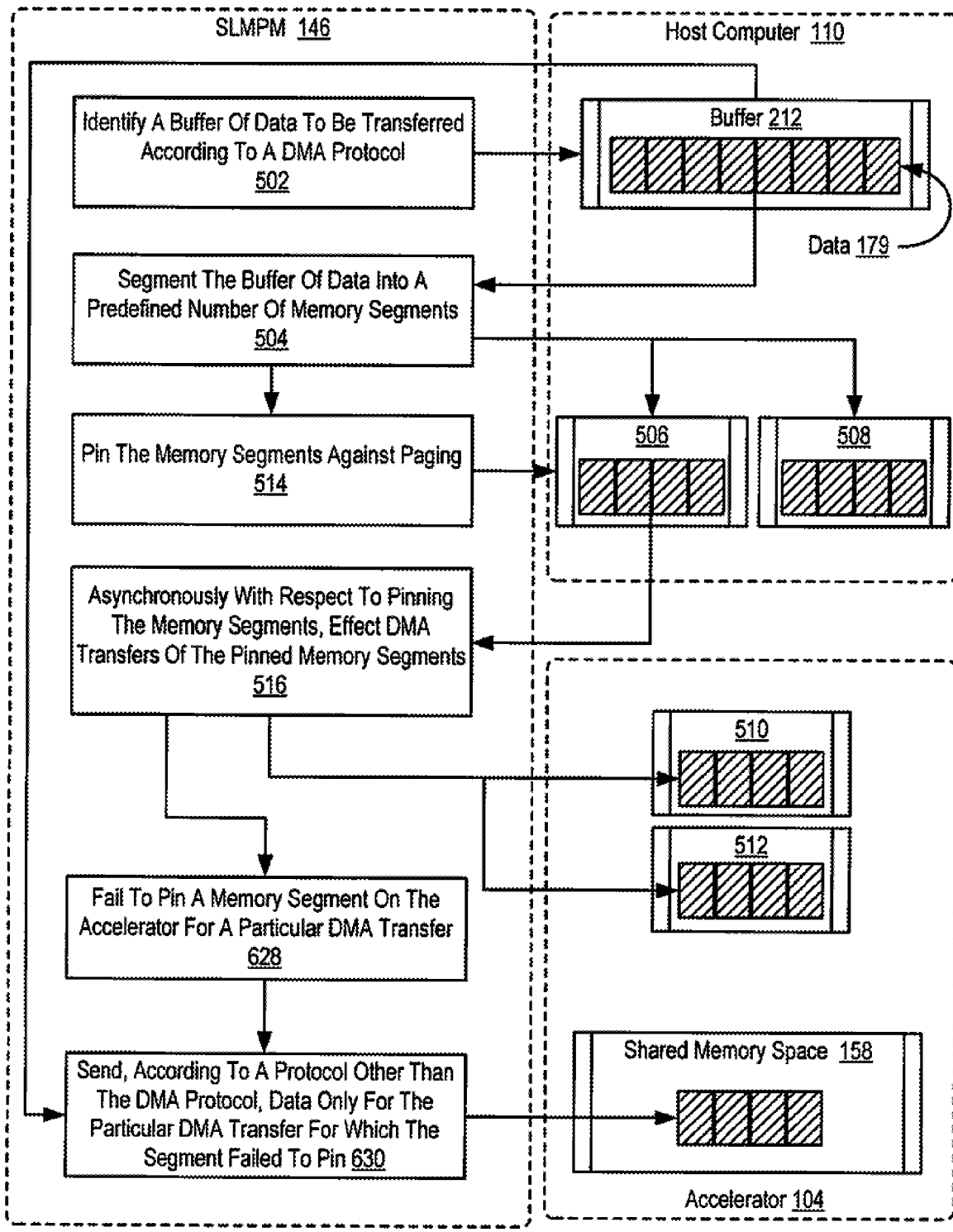
FIG. 10 sets forth a flow chart illustrating a further exemplary method of DMA in a hybrid computing environment according to embodiments of the present invention.

For further explanation, FIG. 10 sets forth a flow chart illustrating a further exemplary method of DMA in a hybrid computing environment according to embodiments of the present invention. The method of FIG. 10, like the method of FIG. 5 is carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types. The method of FIG. 10 is similar to the method of FIG. 5 including, as it does, the system level message passing module's identifying (502) a buffer (212) of data (179) to be transferred from the host computer (110) to the accelerator (104) according to a DMA protocol; segmenting (504) the buffer (212) of data (176) into a predefined number of memory segments (506, 508); pinning (514) the memory segments (506, 508) against paging; and asynchronously with respect to pinning the memory segments, effecting (516) DMA transfers of the pinned memory segments (506, 508) from the host computer (110) to memory segments (510, 512) on the accelerator (104). The method of FIG. 10 differs from the method of FIG. 5, however, in that the method of FIG. 10 includes failing (628), by the system level message passing module (146), to pin a memory segment on the accelerator (104) for a particular DMA transfer from the host computer (110) to the accelerator (104) and sending (630), by the system level message passing module (146) from the host computer (104) according to a data communications protocol other than the DMA protocol, data only for the particular DMA transfer for which the segment failed to pin. Failing (628), by the system level message passing module (146), to pin a memory segment on the accelerator (104) for a particular DMA transfer from the host computer (110) to the accelerator (104) may include sending to an instance of the SLMPM running on the host computer from an instance of the SLMPM running on the accelerator, a negative acknowledgment for the memory segment which failed to pin.

Exemplary embodiments of the present invention are described largely in the context of DMA in a fully functional hybrid computing environment. Readers of skill in the art will recognize, however, that method aspects of the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of direct memory access ('DMA') in a hybrid computing environment, the hybrid computing environment comprising a host computer having a host computer architecture, an accelerator having an accelerator architecture, the accelerator architecture optimized, with respect to the host computer architecture, for speed of execution of a particular class of computing functions, the host computer and the accelerator adapted to one another for data communications by a system level message passing module, the method comprising:

identifying, by the system level message passing module, a buffer of data to be transferred from the host computer to the accelerator according to a DMA protocol;

segmenting, by the system level message passing module, the buffer of data into a predefined number of memory segments;

pinning, by the system level message passing module, the memory segments against paging; and asynchronously with respect to pinning the memory segments, effecting, by the system level message passing module, DMA transfers of the pinned memory segments from the host computer to the accelerator.

2. The method of claim 1 further comprising:

specifying, by the system level message passing module, the number of memory segments in dependence upon a quantity of available real memory, a quantity of available pinning resources, and a quantity of available DMA bandwidth.

3. The method of claim 1 further comprising:

specifying, by the system level message passing module, a size of the memory segments in dependence upon the time required to pin a memory segment and the time required to effect a DMA transfer of a memory segment.

4. The method of claim 1 further comprising:

failing, by the system level message passing module, to pin a first memory segment on the host computer for a DMA transfer from the host computer to the accelerator; and sending, by the system level message passing module from the host computer to the accelerator, all data in the buffer according to a data communications protocol other than the DMA protocol.

5. The method of claim 1 further comprising:

failing, by the system level message passing module, to pin a memory segment on the host computer for a second or later DMA transfer from the host computer to the accelerator; and sending, by the system level message passing module from the host computer to the accelerator, according to a data communications protocol other than the DMA protocol, data only from the segment which failed to pin.

6. The method of claim 1 further comprising:

failing, by the system level message passing module, to pin a memory segment on the accelerator for a particular DMA transfer from the host computer to the accelerator; and sending, by the system level message passing module from the host computer according to a data communications protocol other than the DMA protocol, data only for the particular DMA transfer for which the segment failed to pin.

7. A hybrid computing environment for direct memory access ('DMA'), the hybrid computing environment comprising a host computer having a host computer architecture, an accelerator having an accelerator architecture, the accelerator architecture optimized, with respect to the host computer architecture, for speed of execution of a particular class of computing functions, the host computer and the accelerator adapted to one another for data communications by a system level message passing module, the hybrid computing environment further comprising a computer processor, a computer memory operatively coupled to the computer processor, the computer memory having disposed within it computer program instructions capable of:

identifying, by the system level message passing module, a buffer of data to be transferred from the host computer to the accelerator according to a DMA protocol;

segmenting, by the system level message passing module, the buffer of data into a predefined number of memory segments;

pinning, by the system level message passing module, the memory segments against paging; and asynchronously with respect to pinning the memory segments, effecting, by the system level message passing module, DMA transfers of the pinned memory segments from the host computer to the accelerator.

8. The hybrid computing environment of claim 7 further comprising computer program instructions capable of:

specifying, by the system level message passing module, the number of memory segments in dependence upon a quantity of available real memory, a quantity of available pinning resources, and a quantity of available DMA bandwidth.

9. The hybrid computing environment of claim 7 further comprising computer program instructions capable of:

specifying, by the system level message passing module, a size of the memory segments in dependence upon the time required to pin a memory segment and the time required to effect a DMA transfer of a memory segment.

10. The hybrid computing environment of claim 7 further comprising computer program instructions capable of:

failing, by the system level message passing module, to pin a first memory segment on the host computer for a DMA transfer from the host computer to the accelerator; and sending, by the system level message passing module from the host computer to the accelerator, all data in the buffer according to a data communications protocol other than the DMA protocol.

11. The hybrid computing environment of claim 7 further comprising computer program instructions capable of:

failing, by the system level message passing module, to pin a memory segment on the host computer for a second or later DMA transfer from the host computer to the accelerator; and sending, by the system level message passing module from the host computer to the accelerator, according to a data communications protocol other than the DMA protocol, data only from the segment which failed to pin.

12. The hybrid computing environment of claim 7 further comprising computer program instructions capable of:

failing, by the system level message passing module, to pin a memory segment on the accelerator for a particular DMA transfer from the host computer to the accelerator; and sending, by the system level message passing module from the host computer according to a data communications protocol other than the DMA protocol, data only for the particular DMA transfer for which the segment failed to pin.

13. A computer program product for direct memory access ('DMA') in a hybrid computing environment, the hybrid computing environment comprising a host computer having a host computer architecture, an accelerator having an accelerator architecture, the accelerator architecture optimized, with respect to the host computer architecture, for speed of execution of a particular class of computing functions, the host computer and the accelerator adapted to one another for data communications by a system level message passing module, the computer program product disposed in a computer readable, recordable storage medium, the computer program product comprising computer program instructions capable of:

identifying, by the system level message passing module, a buffer of data to be transferred from the host computer to the accelerator according to a DMA protocol;

segmenting, by the system level message passing module, the buffer of data into a predefined number of memory segments;

pinning, by the system level message passing module, the memory segments against paging; and asynchronously with respect to pinning the memory segments, effecting, by the system level message passing module, DMA transfers of the pinned memory segments from the host computer to the accelerator.

14. The computer program product of claim 13 further comprising computer program instructions capable of:

specifying, by the system level message passing module, the number of memory segments in dependence upon a quantity of available real memory, a quantity of available pinning resources, and a quantity of available DMA bandwidth.

15. The computer program product of claim 13 further comprising computer program instructions capable of:

specifying, by the system level message passing module, a size of the memory segments in dependence upon the time required to pin a memory segment and the time required to effect a DMA transfer of a memory segment.

16. The computer program product of claim 13 further comprising computer program instructions capable of:

failing, by the system level message passing module, to pin a first memory segment on the host computer for a DMA transfer from the host computer to the accelerator; and sending, by the system level message passing module from the host computer to the accelerator, all data in the buffer according to a data communications protocol other than the DMA protocol.

17. The computer program product of claim 13 further comprising computer program instructions capable of:

failing, by the system level message passing module, to pin a memory segment on the host computer for a second or later DMA transfer from the host computer to the accelerator; and sending, by the system level message passing module from the host computer to the accelerator, according to a data communications protocol other than the DMA protocol, data only from the segment which failed to pin.

18. The computer program product of claim 13 further comprising computer program instructions capable of:

failing, by the system level message passing module, to pin a memory segment on the accelerator for a particular DMA transfer from the host computer to the accelerator; and sending, by the system level message passing module from the host computer according to a data communications protocol other than the DMA protocol, data only for the particular DMA transfer for which the segment failed to pin.

\* \* \* \* \*